UNITED STATES PATENT OFFICE.

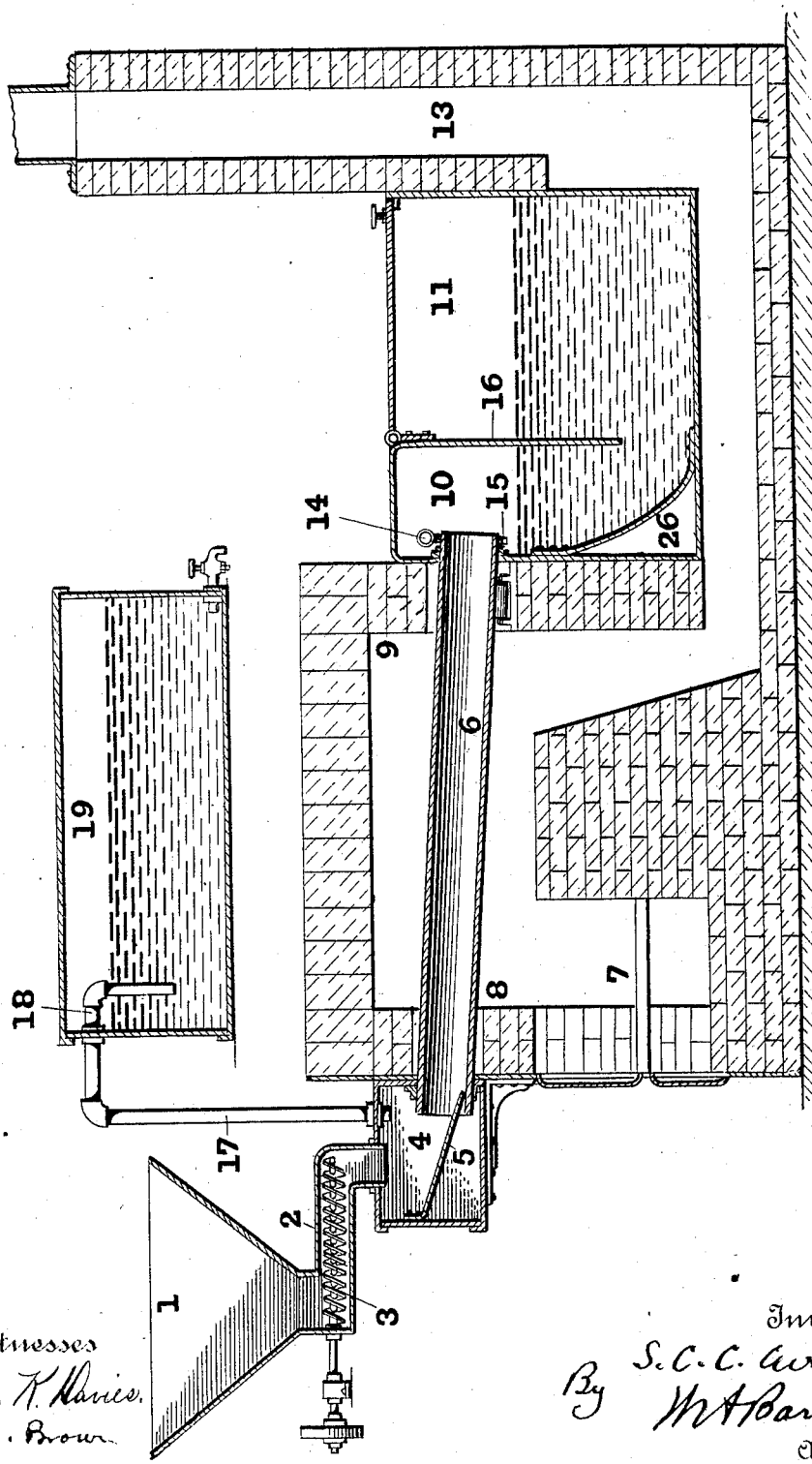

STANLEY C. C. CURRIE, OF NEW YORK, N. Y., ASSIGNOR OF ONE-HALF TO WILLIAM COURTENAY, OF NEW YORK, N. Y.

PROCESS OF TREATING ORES CONTAINING PRECIOUS METALS.

SPECIFICATION forming part of Letters Patent No. 719,757, dated February 3, 1903.

Application filed May 8, 1902. Serial No. 106,491. (No specimens.)

*To all whom it may concern:*

Be it known that I, STANLEY C. C. CURRIE, a citizen of Great Britain, residing at New York, in the county of New York and State of New York, have invented certain new and useful Improvements in Processes of Treating Ores Containing Precious Metals, of which the following is a specification.

This invention relates to the treatment of ores or ore concentrates for the elimination of certain elements of impurities previous to the final roasting and previous to the final chemical treatment of such ores as require such treatment, as chlorination, cyanid treatment, &c., for the extraction of precious metals and to the further utilization of elements employed in the process.

Ores containing precious metals—such as gold, silver, and possibly platinum—almost invariably contain other metals and minerals, such as iron, copper, lead, zinc, arsenic, antimony, sulfur, phosphorus, &c. Some of these materials are rendered less soluble by chemical treatment. Some of the materials or substances contained in such ores volatilize in roasting, and the volatile gases carry off with them a considerable quantity of the precious metals. All the ores contain some substances other than metals, else they would not be ores, but purely metal.

The object of the present invention is to dissolve and wash out of the ore such ingredients as can be reduced to such condition as to be readily dissolved in water or in water and alkali and to change the character of some of the ingredients or component elements of the ore prior to the final roasting or final chemical treatment. By the removal of a solvent material at an early stage I am enabled to overcome many objections to the processes now in vogue and to avoid the subsequent handling and treatment of such removed material.

A further object of the invention is to recover any of the valuable substances in the ores which may be vaporized.

In my application, Serial No. 73,090, filed August 23, 1901, I describe a method of treating raw ores—that is, ores before they reach the condition for final roasting—by a heated oxidizing agent, which agent in said application is stated to be either hot air or steam or a mixture of hot air and steam and the washing out of the soluble material. I further describe an additional step of treating the ore after the oxidizing treatment with an alkaline agent, such as hot caustic alkali, for the purpose of eliminating such salts as are capable of solution in such agent, such salts having been developed or rendered more soluble by the oxidizing action referred to. In said application I describe a repetition of such steps.

In the application above referred to it was ruled by the Commissioner of Patents that I might not in such application specifically claim the treatment of such ores both by hot air and by steam as oxidizing agents. I therefore claim in the present application the step in the process which consists in the treatment of the ore by steam as an oxidizing agent and the same step and a subsequent treatment by alkali, and I further claim herein certain steps and subprocesses which consist in the alternation and in the repetition of the steps above outlined, the repetition being usually accompanied by an increase of heat.

Ores containing precious metals are exceedingly variable in their characteristics. Some auriferous ores are known as "sulfurets," and contain sulfur in combination with baser metals, such as copper, lead, zinc, iron, &c. When some varieties of such ores are roasted, especially at high temperatures, some oxids are produced on which chlorin or cyanid used in subsequent treatment has little or no effect. With other ores after roasting, especially such as contain copper, there has been much loss by lixiviation.

In the present invention the ores of variable character, but usually such as are known as "sulfurets," are first pulverized by any known and usual means, and "concentrates" of such ores may be obtained in any known way. The pulverized ore, whether complete or concentrate, is placed in a receptacle, preferably closed, and usually in its raw state. In such receptacle the ore is submitted to a treatment by heat and by steam. The steam heat may be regulated to any desirable extent. This steam treatment transforms some of the insoluble material in the ore to a soluble salt, often without loss by volatilization. This is due to the combination of oxygen carried to the ore by the oxidizing agent with some of the sulfur and other compounds, producing new combinations or salts of metals, which are more soluble in water than the original compounds, and generally such compounds or salts are more susceptible to the action of alkali than were the original compounds. After the step of oxidation the ore is preferably first exposed to the action of hot caustic alkali and then washed in water. The water will wash away the soluble salts formed or rendered more soluble by steam treatment or by the steam and alkali. Sulfates of iron and copper and some other salts and compounds can generally be washed away from the ore at this stage. The hot caustic alkali renders soluble some of the metals or metallic salts contained in the ore, such as lead, arsenic, antimony, or the salts thereof. The hot caustic alkali can be applied to the ore in any suitable manner, according to the capacity and convenience of the mechanism employed. If the ore is washed with water immediately after the oxidizing treatment, it may then be subjected to the action of hot caustic alkali and then again washed. The steaming and alkaline treatment may alternate or one be gradually changed for the other, according to conditions. The foregoing steps may be repeated as many times as may be necessary. It is found that after a part of the metallic salts has been washed away other parts are more susceptible to solution by a repetition of the treatment. Thus it often happens that a greater percentage of the metallic ingredients or less valuable portions of the ore can be washed away by exposing the ore repeatedly to the action of the oxidizing agent and to the action of water than by a single exposure. Preferably, however, each succeeding treatment of the ore by the oxidizing agent will be at a higher temperature than the preceding treatment, and the caustic-alkaline treatment may be repeated or not, accordingly as the first alkaline treatment has been successful in rendering soluble such substances as are dissolved or strongly attacked by the alkaline agent.

It is not to be supposed that this method of treatment is of great utility in the treatment of ores without the exercise of intelligence and judgment on the part of the operator. Assuming that the operator has some knowledge of the properties of such ores as are usually treated for the extraction of the precious metals contained therein, the above-described treatment of the pulverized raw ores or ores in which the soluble elements have not been fixed by roasting enables the operator to remove a large quantity of material which would otherwise pass to the final stage of chemical treatment to there absorb chemicals and to be obstructive to the chemical and mechanical actions usually resorted to to obtain the precious metals from the ores. Judgment must be used as to the time during which the ore is exposed to the oxidizing agent, (in this case steam,) and judgment must be used as to the temperature at which the steam shall be used. So, also, the strength of the caustic-alkaline solution (preferably potash) must be a matter of judgment or of tentative trial, as well as the temperature at which the same shall be used.

The treatment by the oxidizing agent and by alkali involves very little expense and frequently will more than pay the cost of such treatment by saving of metals which are volatilized and lost by the common roasting process.

In cases where the ore contains little or no metallic salts which will volatilize by roasting the ore may be roasted or partially roasted before the treatment by oxidation and washing, as above described.

Of course it will be understood that valuable minerals may be recovered from the water with which the ore is washed, should such be present, by any of the known processes for recovering soluble metallic salts from solutions in which they are present.

In my application, Serial No. 103,400, filed April 17, 1902, I illustrate one of many mechanisms by which my method may be carried out.

The drawing herewith is a vertical central section of so much of the mechanism as may be used to carry out the present process, except that the repetition or alternation of some of the steps may be effected in preliminary or supplementary mechanism.

Pulverized ore is fed to hopper 1, thence passes by gravity to conveyer 2, and by screw 3 is forced along to the closed chamber 4, then falls on incline 5, and slides down into drum 6. A fire on grate 7 sends heat up passage 8 around the drum 6, and the hot products of combustion finally pass up stack 13. Brickwork 9 surrounds drum 6. Drum 6 is rotated by any suitable mechanism, as 14 15. The lower end of drum 6 is in chamber 10, which has a downwardly-extending cover or partition 16, below which a water seal prevents gas from escaping out under partition 16, while the ore may pass down the incline 26, and so out into trough or vessel 11. The heat-passage preferably passes under vessel 11, so that the same is kept hot. The hot ore dropping into the liquid in this vessel, which liquid may be water or may be a caustic-alkali solution, develops steam, which flows back through drum 6. This abstraction of steam tends to make the remaining alkaline solution stronger. The hot ore dropping into hot caustic alkali is thereby acted on to render soluble some elements before insoluble. Any volatile gases developed in chamber 6 pass to chamber 4 and thence by pipe 17 18 to condensing-chamber 19, which chamber may contain water or other condensing liquid. The liquid seal at the mouth of chamber 10 compels the steam developed in said chamber to flow back through drum 6 and act on the ore coming through the same. Chamber 11 may be covered in any suitable manner to prevent steam escape.

As has been stated, some varieties of ore differ greatly from other varieties, although there may be more or less of the precious metals in all to which my process is applicable. Thus it may happen that some of the precious metals or other valuable substances may be carried off from the ore in volatile form, even at the relatively low temperature at which my method is used. In such case I provide for the preservation of the volatilized substances or such as have value—as, for instance, by conveying the volatile gases to a condensing-chamber. The pipe 17 extends upward from chamber 4 and has a return-bend leading to vessel 19, which has a liquid therein and serves to condense the vapors. From the condensed material so obtained the valuable portions may be extracted by any of the usual processes.

I do not in any manner confine my claims to the mechanism herein shown, the same being illustrated merely as a convenient mechanism for the purpose.

What I claim is—

1. The method of utilizing the heat of ores containing precious metals, which consists in passing the pulverized ore through a heated conduit, then plunging it into a bath containing water, thereby developing steam, and utilizing the steam so developed as an agent in the treatment of other quantities of ore.

2. The step in the art of extracting precious metals from ores containing such metals, which consists in subjecting the pulverized ore to the action of steam and an alkaline agent, then washing with water, preparatory to further treatment of the ore.

3. The step in the art of extracting precious metals from ores containing such metals, which consists in subjecting the pulverized ore, in a closed vessel, to the action of steam, then washing with water, then repeating the step, preparatory to further treatment of the remaining ore.

4. The step in the art of extracting precious metals from ores containing such metals, which consists in subjecting the pulverized ore in a closed vessel to the action of steam, and to the further action of hot caustic alkali, then washing, prior to further treatment of the remaining ore.

5. The step in the art of extracting precious metals from ores wherein such are contained, which consists in treating the pulverized ore by heat and by steam, and afterward immersing the ore in a solution of hot caustic alkali.

6. The subprocess of extracting precious metals from their ores, which consists in subjecting the pulverized ore to the action of steam and heat, then to the action of a hot alkali, then washing.

7. The subprocess of treating ores for the extraction of precious metals therein contained, which consists in treating the ore with steam and heat, in a closed vessel, then to an alkaline treatment, then washing away soluble portions with water.

8. The method of treating ores for the extraction of precious metals therein contained, which consists in passing the pulverized ores through a heated chamber and exposing them to an oxidizing agent therein, collecting and separately condensing the volatile products of such treatment, and dissolving from the body of the ore by an alkaline liquid certain elements made more soluble by the oxidizing treatment.

9. The method of treating ore containing precious metal, which consists in passing the pulverized ore through a heated receptacle and thence to an aqueous fluid, and causing the steam developed by the hot ore to flow back through the heated receptacle, and to act on the incoming ore therein.

10. The method of treating ore containing precious metal, which consists in passing the pulverized ore through a heated receptacle and thence to an aqueous alkaline solution, developing steam in said solution, thereby strengthening the same, and conveying the steam developed in the solution through the heated receptacle to act on incoming ore.

11. The method of treating ores of the character described, which consists in passing the pulverized ore slowly through a closed and heated receptacle, plunging the ore into a liquid at the mouth of the receptacle which liquid forms a seal, conveying the steam so formed back through the heated receptacle so that it acts on the incoming ore, and removing the ore through the liquid which forms the seal.

12. The method of treating ore of the character described, which consists in heating the raw pulverized ore in contact with steam, and plunging the heated ore into an aqueous alkaline solution.

In testimony whereof I affix my signature in presence of two witnesses.

STANLEY C. C. CURRIE.

Witnesses:
GEORGE L. COURTENAY,
BERTRAM C. SMITH.